Jan. 1, 1935.  C. F. RICHARD  1,986,069
FILLING AND WEIGHING MACHINE
Filed Oct. 5, 1931  10 Sheets-Sheet 4
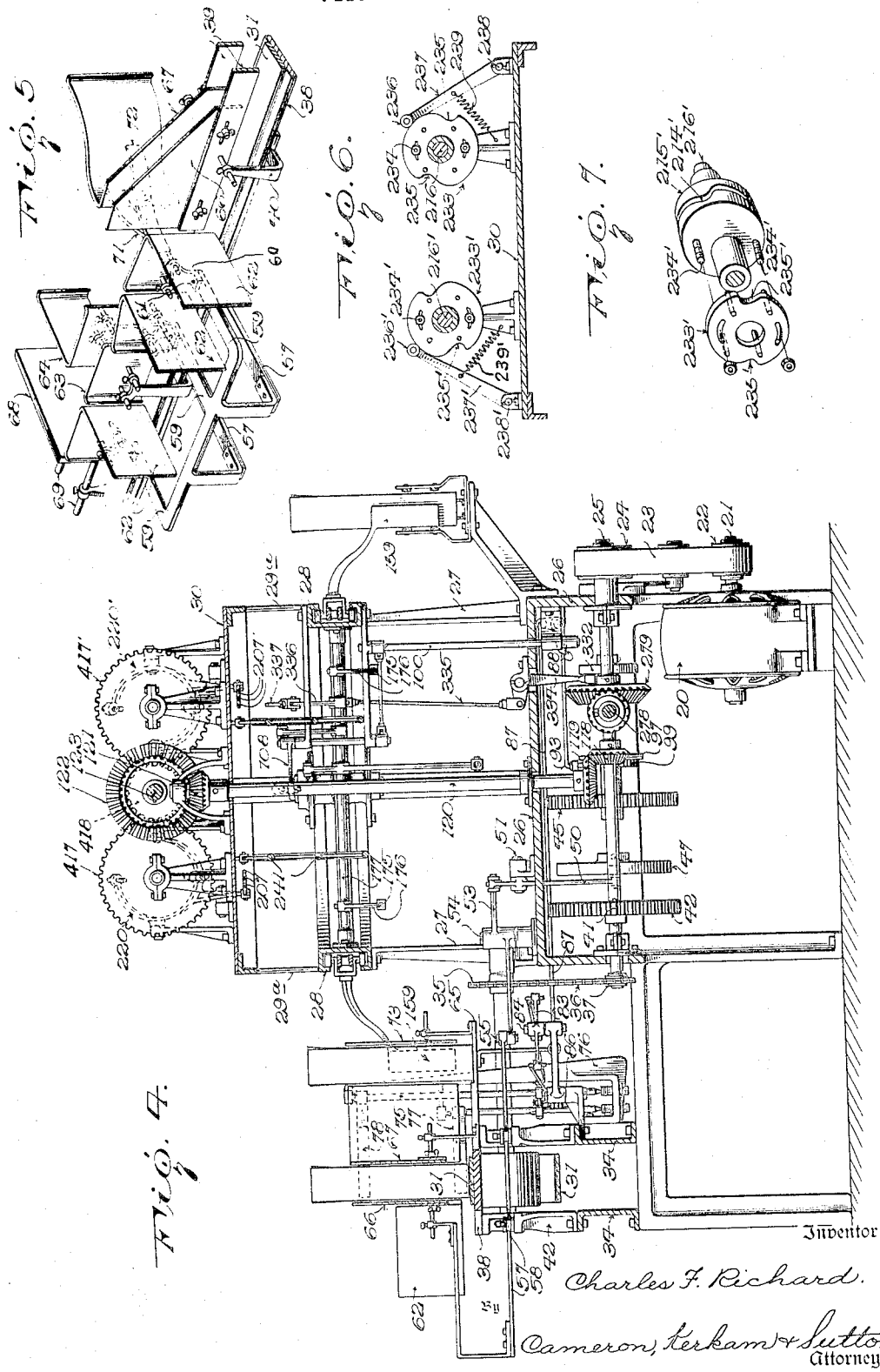
Inventor
Charles F. Richard.
By Cameron, Kerkam & Sutton.
Attorneys Jan. 1, 1935.　　　C. F. RICHARD　　　1,986,069
FILLING AND WEIGHING MACHINE
Filed Oct. 5, 1931　　10 Sheets-Sheet 5
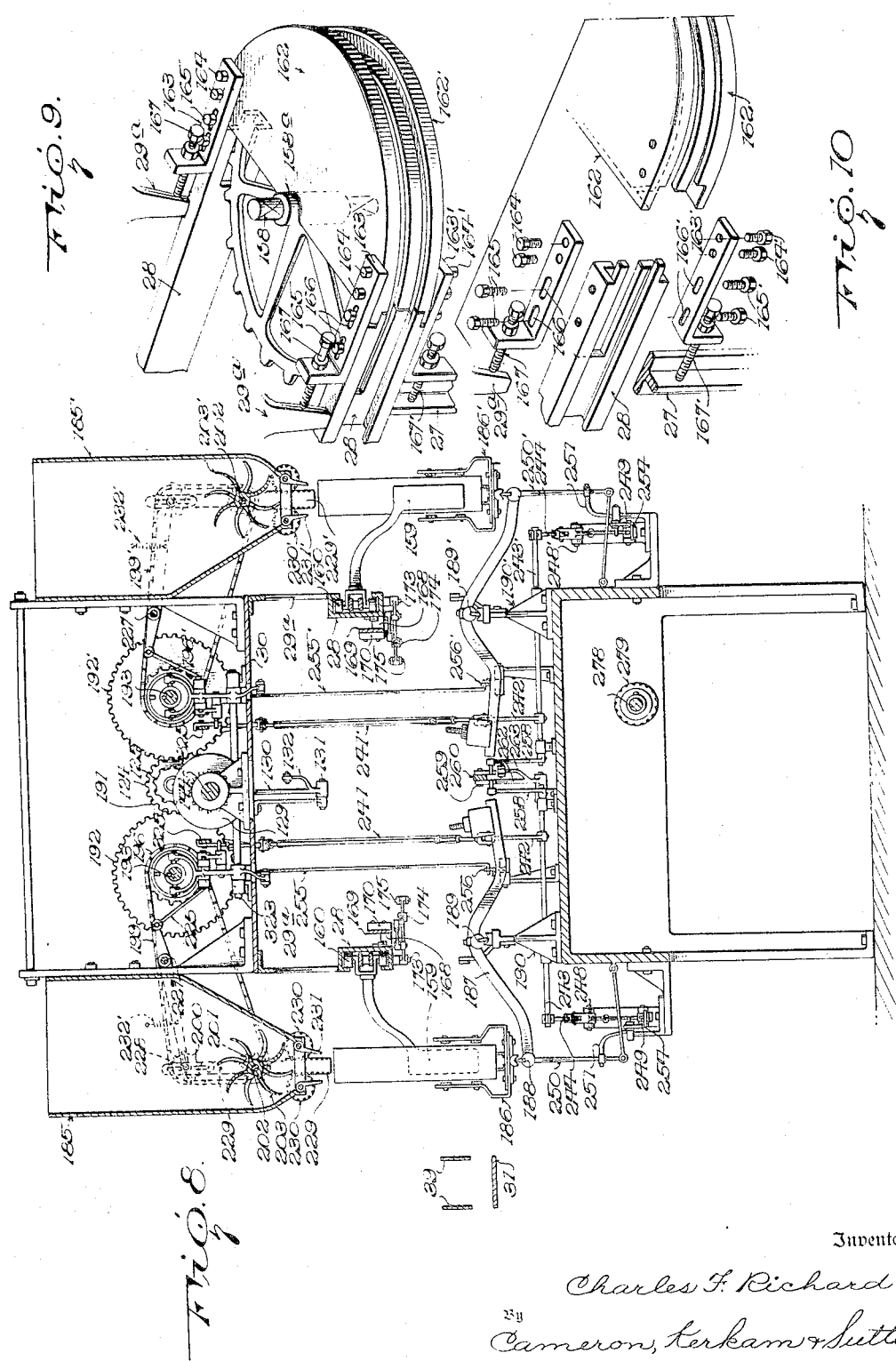
Inventor
Charles F. Richard
By Cameron, Kerkam & Sutton
Attorneys Jan. 1, 1935.  C. F. RICHARD  1,986,069
FILLING AND WEIGHING MACHINE
Filed Oct. 5, 1931    10 Sheets-Sheet 6
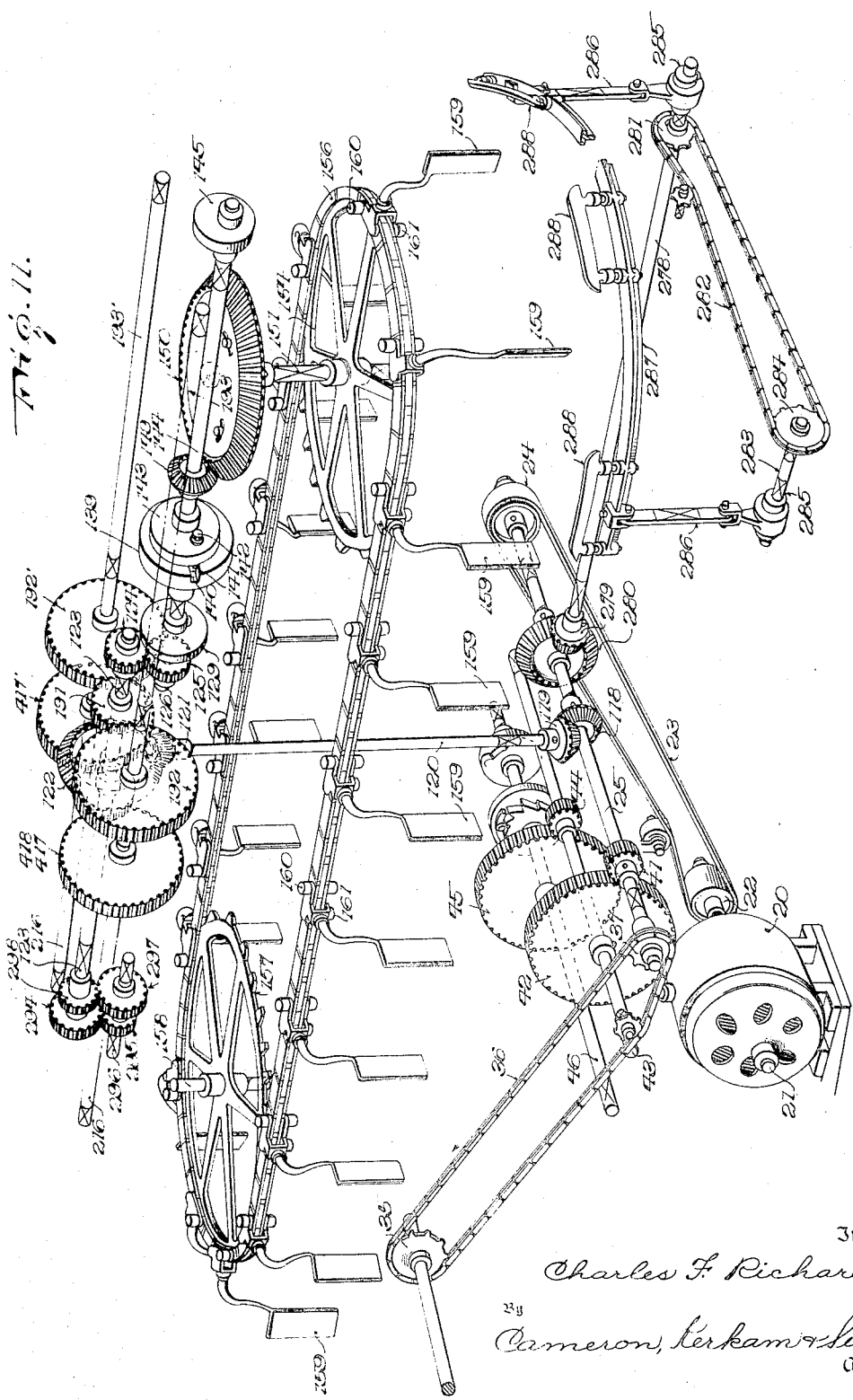
Inventor
Charles F. Richard.
By Cameron, Kerkam & Sutton.
Attorneys

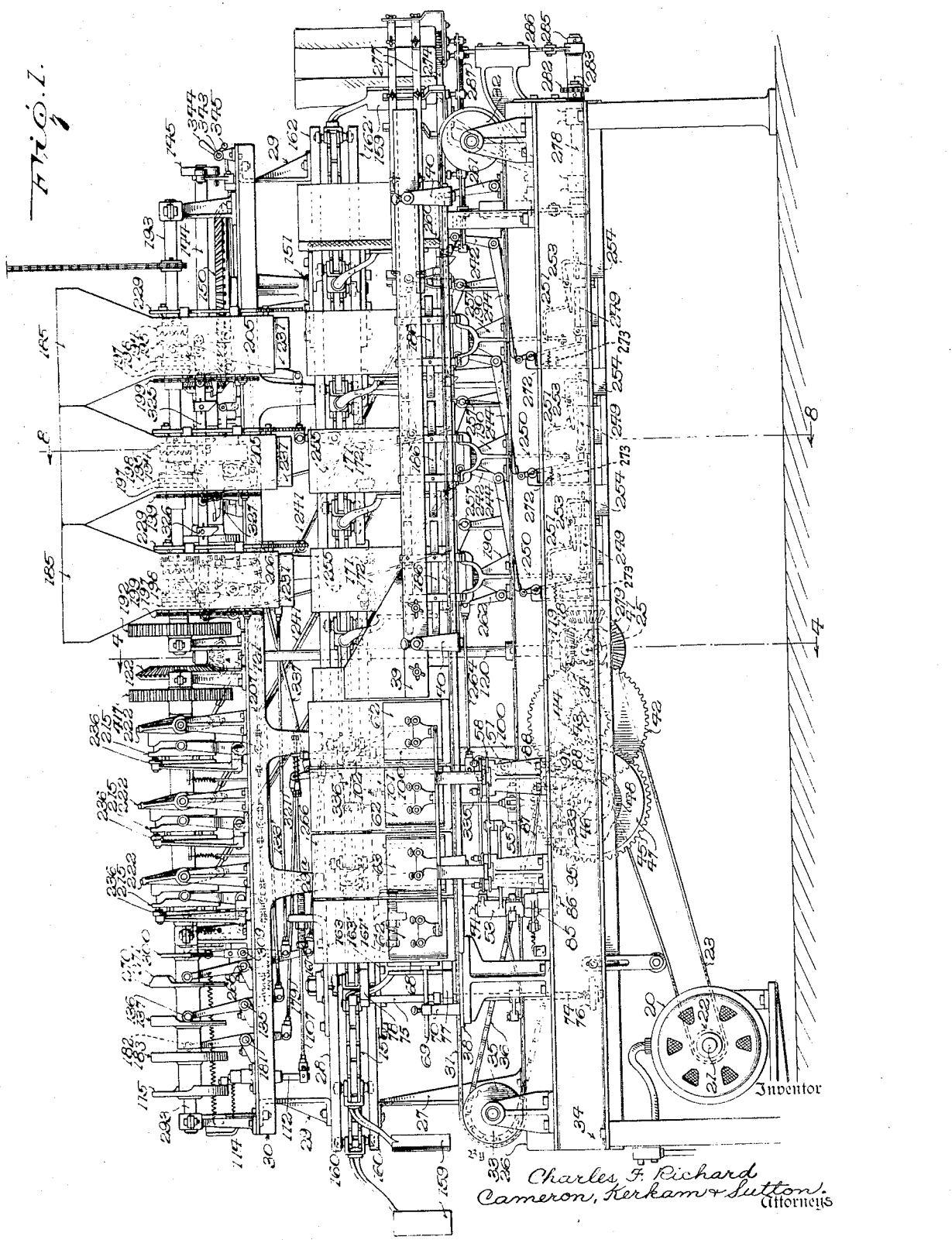

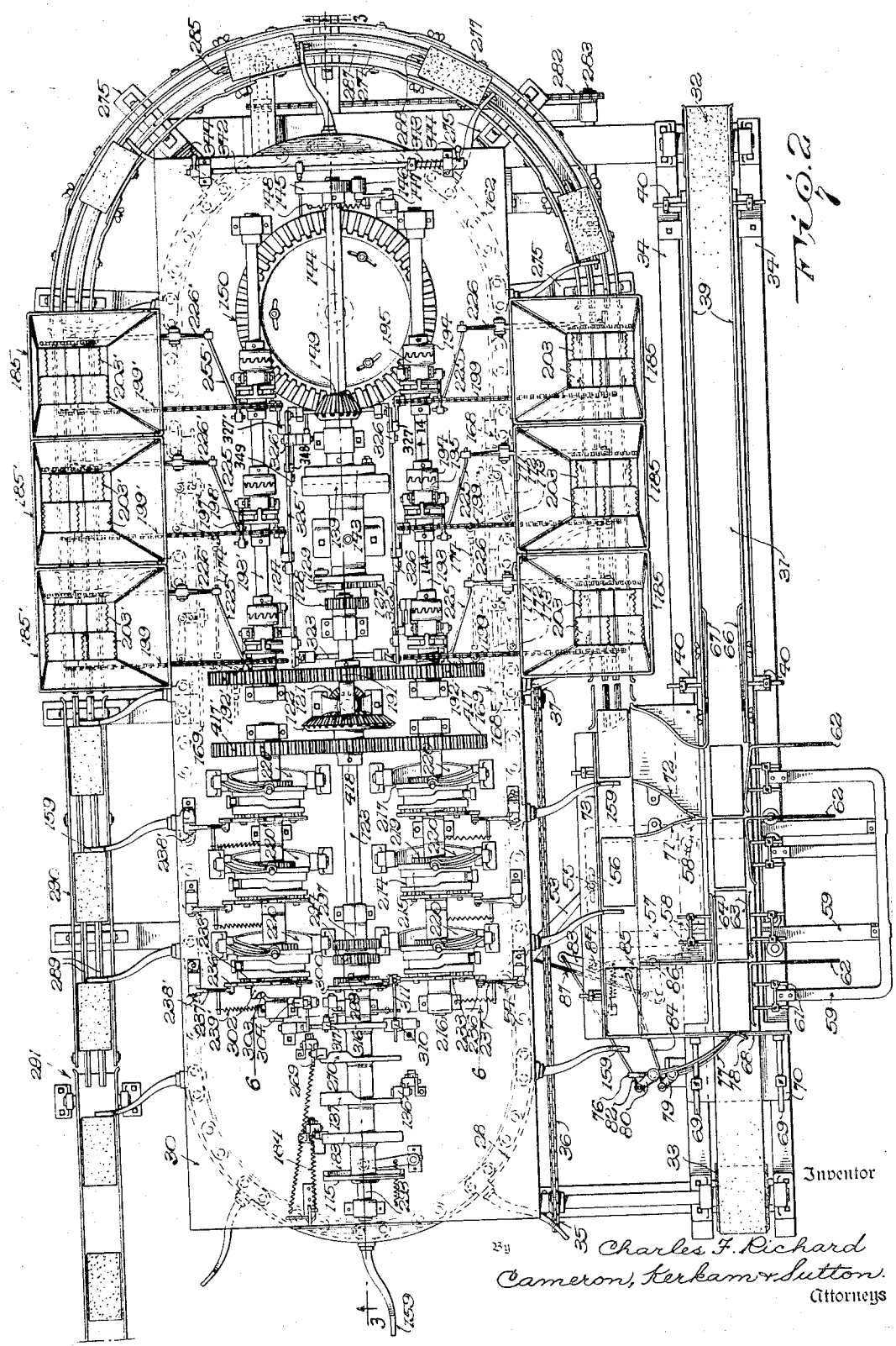

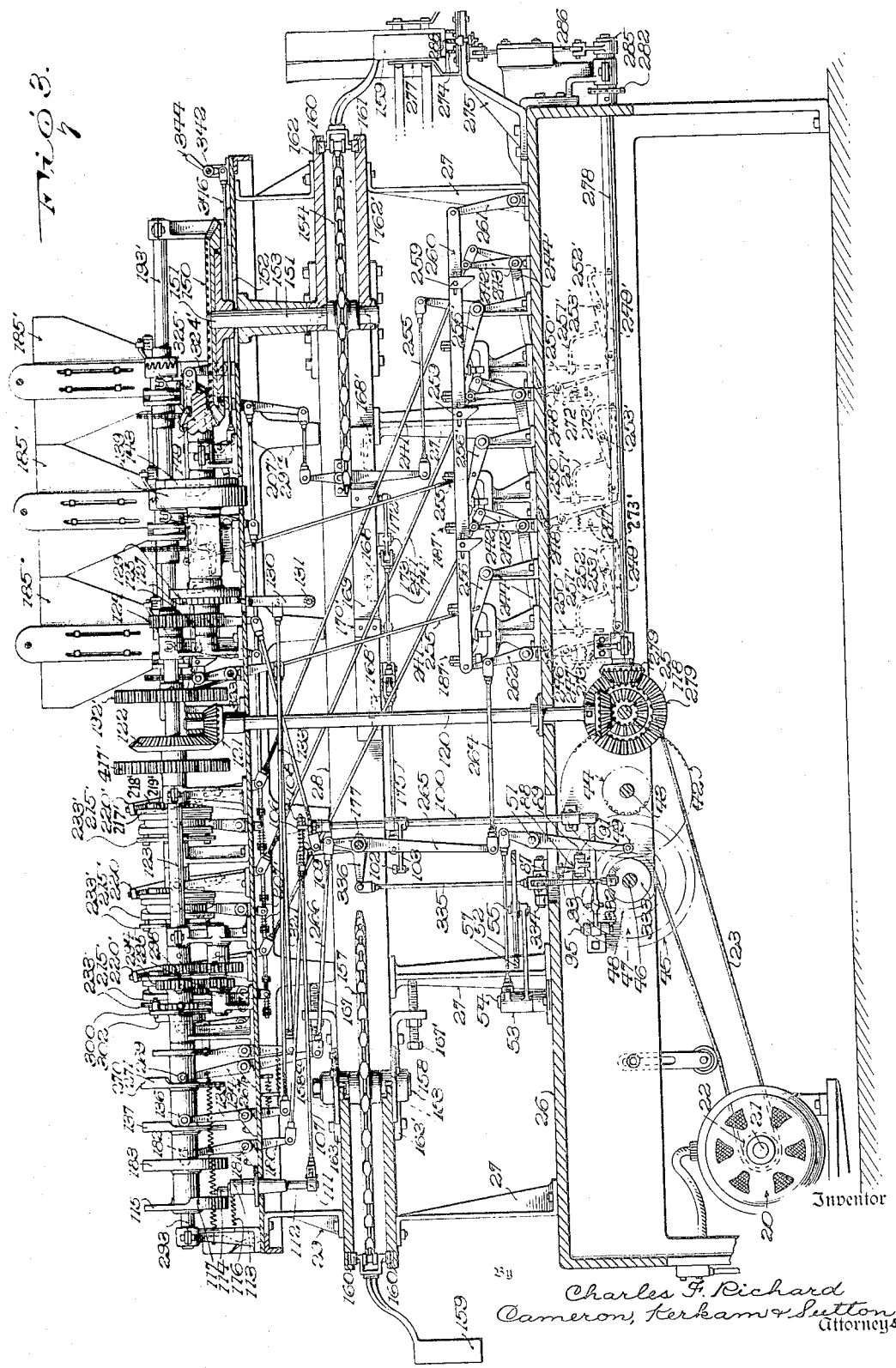

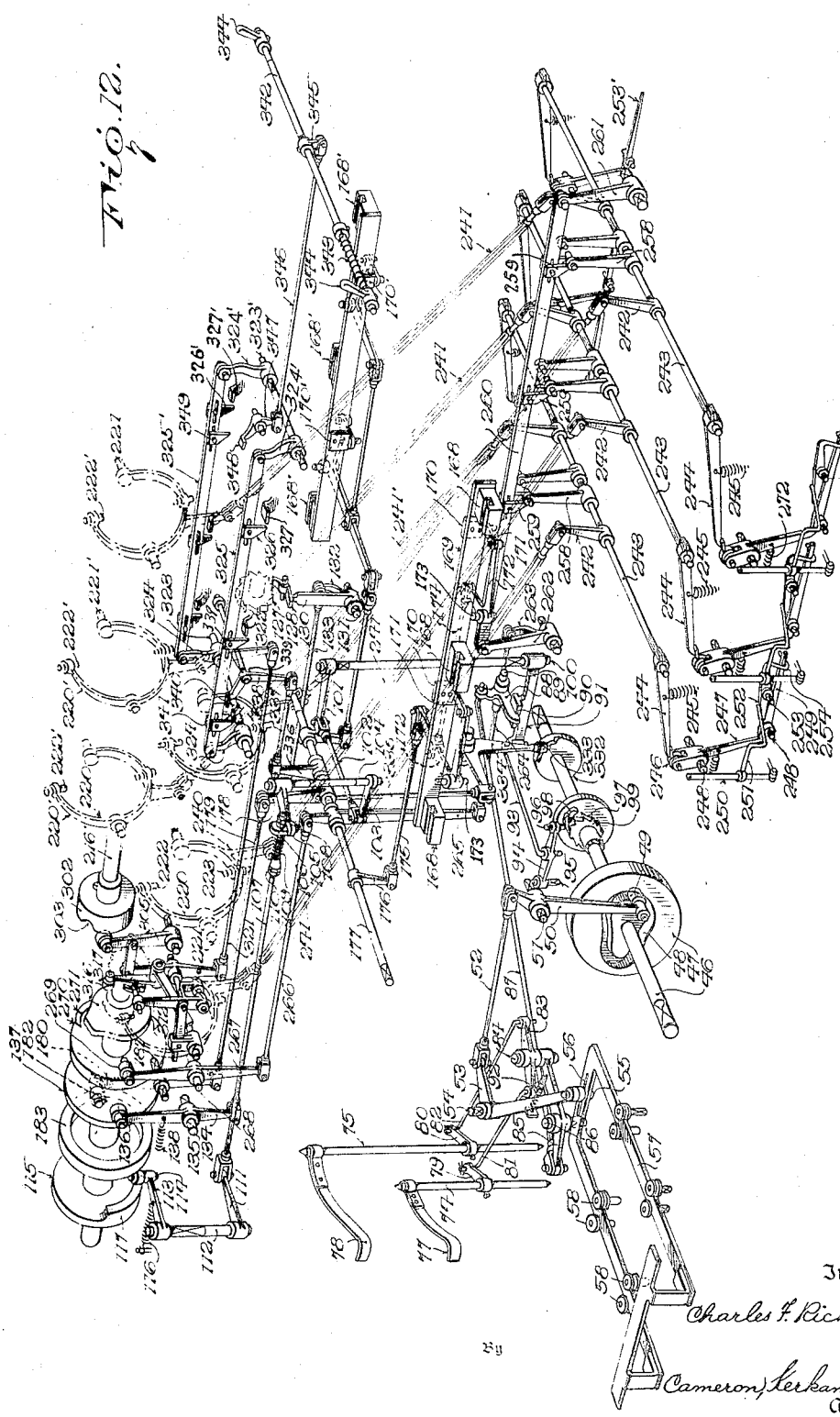

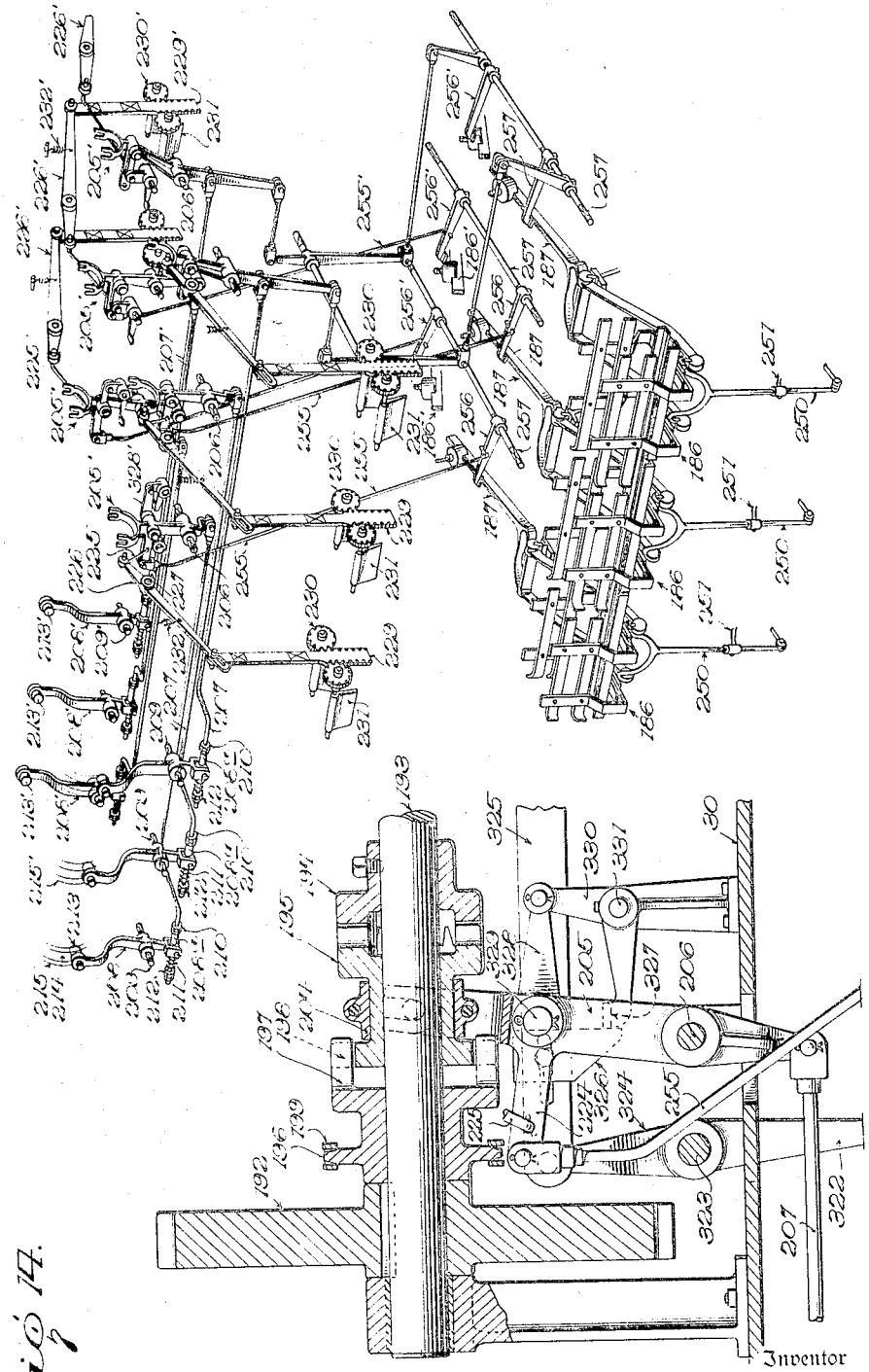

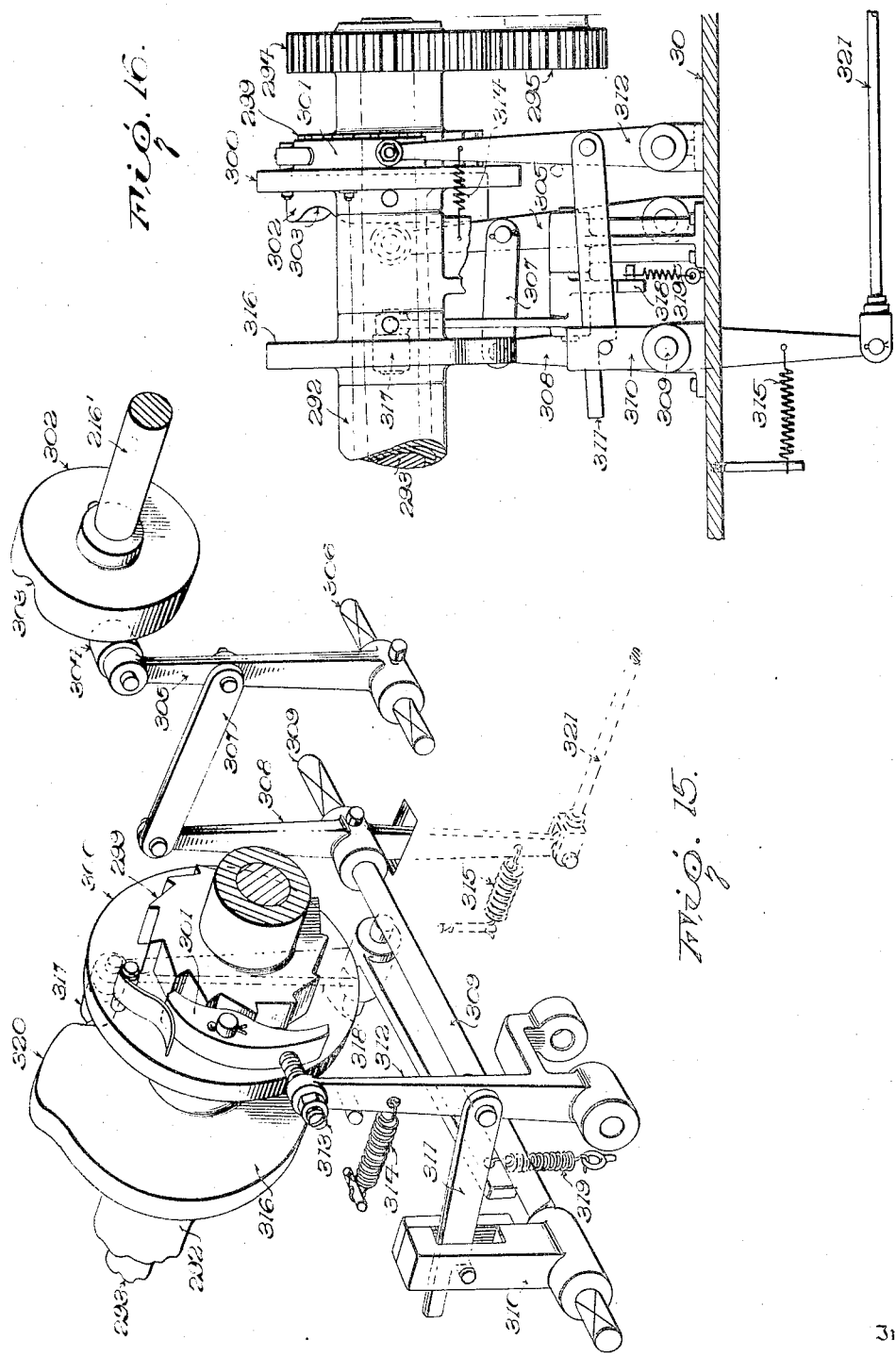

Patented Jan. 1, 1935

1,986,069

UNITED STATES PATENT OFFICE 1,986,069

FILLING AND WEIGHING MACHINE

Charles F. Richard, Battle Creek, Mich., assignor to Johnson Automatic Sealer Co., Ltd., Battle Creek, Mich., a partnership association limited of Michigan Application October 5, 1931, Serial No. 567,105

10 Claims. (Cl. 249—59)

This invention relates to carton filling and weighing machines and more particularly to machines of the type wherein the cartons receive a preliminary or rough filling and weighing at one position and are thereafter moved to another position where the carton is finally filled and weighed.

The principal objects of the invention are to provide a novel machine of this type capable of handling packages or cartons at a high rate of speed and taking up a small amount of floor space; a machine capable of transferring packages in groups, preferably in threes, from a conveyor to the machine and of handling, filling and weighing the packages of each group simultaneously; a machine wherein the rough loading and weighing and the final loading and weighing mechanisms are located on opposite sides of the machine, in order to save space and to provide for operation of the loading and weighing mechanisms from a common control mechanism; a machine wherein the fingers which push the packages between the various positions in the machine are freed or released from the packages during weighing; and a machine wherein the various package transferring, filling and weighing operations are all controlled from a single master cam so that all control points in the machine must be in proper condition before any of these operations take place. Other objects will appear more fully hereinafter.

One embodiment of the invention has been illustrated in the accompanying drawings but it is to be expressly understood that said drawings are for purposes of illustration only and are not to be construed as a definition of the limits of the invention, reference being had to the appended claims for this purpose.

In the drawings,

Fig. 1 is a side elevation of a machine embodying the invention;

Fig. 2 is a top plan view of the machine shown in Fig. 1;

Fig. 3 is a vertical section taken on the line 3—3 of Fig. 2;

Fig. 4 is a vertical section taken on the line 4—4 of Fig. 1;

Fig. 5 is a perspective view showing a portion of the infeed mechanism for empty cartons or packages;

Fig. 6 is a detail section taken on the line 6—6 of Fig. 2;

Fig. 7 is a detail perspective view of part of the mechanism shown in Fig. 6;

Fig. 8 is a vertical section on the line 8—8 of Fig. 1;

Fig. 9 is a detail perspective view of a portion of the carrier guideway at the left-hand end of the machine;

Fig. 10 is a detail perspective view of a part of Fig. 9, the parts being shown separated;

Figure 17:
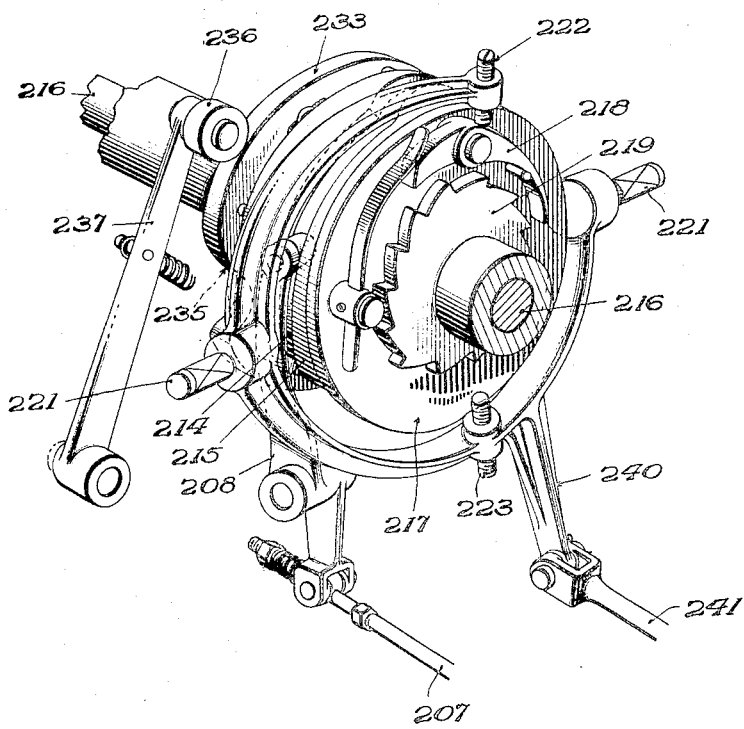

Figs. 11, 12, and 13 are perspective views showing various operating mechanism for the machine, parts being removed for the sake of clearness;

Fig. 14 is a section taken on the line 14—14 of Fig. 2;

Fig. 15 is a perspective view of the master cam and associated mechanism;

Fig. 16 is a side view of the mechanism shown in Fig. 15; and

Fig. 17 is a detail perspective view of certain elements of the control mechanism for the filling and weighing devices.

Summarizing the operations of the machine briefly, the empty cartons or packages are fed to the machine in any suitable manner and are transferred by suitable mechanism to a package carrier in groups each preferably comprising three packages. The carrier first delivers these groups of packages to a plurality of rough loading and weighing devices, one for each package of a group, and then further conveys the packages to the opposite side of the machine to a plurality of drip stream loading and weighing devices, one for each package of a group. During the transfer of the packages from the rough loading and weighing devices to the drip stream loading and weighing devices, they are preferably given a shake-down movement and after leaving the drip stream filling and weighing devices the packages are conveyed from the machine in any desired manner.

Referring now to the drawings, the machine is operated by any suitable means such as an electric motor 20 on the shaft 21 of which is secured a pulley 22. A belt 23 passes around the pulley 22 and through the medium of a second pulley 24 drives a continuously rotating main drive shaft 25. A base 26 (Figs. 1 and 4), in which the drive shaft 25 is journalled, provides a bed for the machine and by means of suitable brackets 27 supports carrier raceways 28. Brackets 29 mounted on the carrier raceways 28 and legs 29a resting on said raceways support a table 30 on which are mounted the various mechanisms controlling the operation of the machine.

In the form shown, a continuous supply of empty packages or cartons is provided by a suitable endless belt or tape conveyor 31 (Figs. 2 and 4) passing around rollers 32 and 33 that are mounted in bearings on supports 34 suitably secured to the base 26, the roller 33 being driven in any suitable manner as by means of a sprocket wheel 35, chain 36 and sprocket wheel 37 fixed on the end of the continuously rotating drive shaft 25. The upper reach of the conveyor 31 passes over and is supported by a slideway 38 (Figs. 1 and 4) supported on the members 34, and the packages on the conveyor are guided by rails 39 adjustably secured to brackets 40 which are carried by the slideway 38.

The conveyor 31 delivers the empty packages to a transfer mechanism whereby they are transferred in groups to the machine for filling and weighing. In the form shown, the packages are transferred in groups of three by the mechanism illustrated particularly in Figs. 2, 5, 11 and 12. Referring first to Fig. 11, the drive shaft 25 has fixed thereon a gear 41 meshing with a large gear 42 fixed on a countershaft 43. A gear 44 on said countershaft in turn meshes with a large gear 45 that is loosely mounted on a second countershaft 46, the latter being intermittently driven by gear 45 under the control of mechanism described hereinafter. Mounted on the shaft 46 is a cam 47 (Fig. 12) having a cam groove 48 in which engages a roller 49 on one end of a bell crank lever 50 pivoted at 51 on the machine base 26. A connecting rod 52 is secured at one of its ends to the arm of the bell crank lever 50 and at its other end to one arm of a bell crank lever 53 pivoted at 54 on the machine base 26. The other arm of bell crank lever 53 is provided with a pin or roller 55 engaging in a slot 56 formed in the frame 57 of a package transfer carriage. The carriage 57 is slidably mounted as by means of rollers 58 and is provided (Fig. 5) with a plurality of arms 59 having at their ends brackets 60 in which are adjustably mounted the supporting rods 61 of substantially L-shaped pusher plates 62.

As shown more clearly in Figs. 2 and 5, there are three pusher plates 62 and between the paths of movement of two of these pusher plates are a pair of stationary stop plates 63 and 64. The slideway 38 is provided with a laterally extending portion 65 constituting a transfer table. As the packages are fed to the machine by the conveyor 31, they pass between stationary plates 66 and 67 secured to the rails 39 and forming a restriction as seen in Fig. 2 through which the packages are forced by the conveyor tape. As shown in this figure, four packages are in position to be transferred into the machine, the extent of movement of the leading package being limited by a stop plate 68 adjustably carried by rods 69 mounted in brackets 70. On lateral movement of the carriage 57 caused by the cam 47 and its connections to the carriage, the leading package and the third and fourth packages are pushed laterally across the table 65 by the pusher plates 62 while the second package is held stationary between the stop plates 63 and 64. As shown in Fig. 2, the lateral movement of the leading package is guided by the stop plate 68 and by one arm of the stop plate 64 while the movement of the third and fourth packages is guided by deflector strips 71 and 72 and by a curved arm of the plate 67 so that the three packages are separated and moved into equally spaced positions. As shown best in Fig. 5, deflector strips 71 and 72 are so constructed and arranged as not to interfere with rectilinear lateral movement of pusher plates 62. The extent of lateral movement of the packages can be controlled in any suitable manner as by means of a stationary stop plate 73. During this movement of the carriage 57, additional packages are prevented from being fed into transfer position by the laterally extending arms of the pusher plates 62.

Means are provided for intermittently rotating the drive shaft 46 to operate the carriage 57 and said means are preferably controlled by movement of the leading package against stop plate 68 so that the carriage will not be operated unless the proper number of packages are in position to be transferred into the machine. Referring particularly to Figs. 1, 4 and 12, two vertical shafts 74 and 75 are supported on bearings carried by a bracket 76 secured to the members 34, said shafts being provided at their upper ends with curved fingers 77 and 78 respectively which are adapted to be engaged by the leading package above and below the stop plate 68. Shafts 74 and 75 are provided with arms 79 and 80 and connecting rods 81 and 82 are connected to the arms 79 and 80 respectively and to the opposite ends of a rocking lever 83 pivoted at 84 on one end of a bell crank lever 85. The latter is suitably pivoted as at 86 on one of the supporting members 34 and has connected to its other end a connecting rod 87 which is in turn connected to one arm of a latch 88 pivoted at 89 on the machine base 26. This latch 88 is normally held in a slot 90 formed in a trip lever 91 by means of a spring 92 connected between the bell crank lever 85 and a stationary part of the machine, the tension of which is preferably so adjusted that the latch 88 will not be tripped until at least four packages are pressing against the arms 77 and 78.

The outer end of trip lever 91 is connected by means of a rod 93 with a lever 94 pivoted at 95 and carrying at its outer end a stop pin 96. Secured to the shaft 46 is a pawl carrier 97 carrying a spring-pressed pawl 98 adapted to engage the teeth of a ratchet 99 secured to the hub of gear 45 so that when the pawl 98 engages the ratchet 99 the shaft 46 is driven by said gear. When the packages are brought in position before the pusher plates 62, the two fingers 77 and 78 are engaged by the leading package, shafts 74 and 75 are rocked to swing the lever 85 about its pivot, and the latch 88 is tripped out of the slot 90 in the trip lever 91. This permits the trip lever to be rocked by a mechanism to be described so as to swing the lever 94 about its pivot and to release the spring-pressed pawl 98. If the fingers 77 and 78 are not operated, or if only one of the fingers is operated, the latch 88 will not be tripped and the pawl 98 will remain engaged by the stop pin 96 so that the shaft 46 cannot rotate and the carriage 57 will not be operated.

The trip lever 91 is rocked in timed relation with the operation of the machine (assuming that the latch 88 has been tripped) by mechanism including a cam constituting a part of a timing cam assembly. Referring to Fig. 12, the trip lever 91 is mounted on the lower end of a vertical shaft 100 mounted in suitable bearings and carrying at its upper end a rock arm 101. A rod 102 connects the arm 101 with a second rock arm 103 carried by a vertical stub shaft 104 which in turn carries at its upper end a rock arm 105 having at its end an apertured bracket 106. A connecting rod 107 extends loosely through the apertured bracket 106 and is provided on one side of said bracket with a stop nut 108 and on the other side of said bracket with a normally compressed spring 109 and a stop nut 110. Connecting rod 107 is connected at its other end to a rock arm 111 carried by a vertical stub shaft 112, and a second rock arm 113 secured to the shaft 112 carries a cam roller 114 held in engagement with the surface of a cam 115 by virtue of a spring 116. Cam 115 is provided with a raised portion 117 which causes the arm 113 and shaft 112 to be rocked in a clockwise direction as seen in Fig. 12 at intervals timed in relation to the operation of the machine.

When the latch 88 is tripped as above described, the roller 114 is engaged with the low portion of cam 115 as shown in the drawings and the nut 108 holds the bracket 106 and arm 105 against movement. When the cam 115 rotates and roller 114 rides over the raised portion 117, rod 107 is moved to the right as seen in Fig. 12 and the spring 109 acts on bracket 106 and arm 105 to rock the shafts 104 and 100 in a counter-clockwise direction as seen in Fig. 12 and accordingly to move the stop pin 96 out of engagement with the pawl 98, permitting the latter to engage the ratchet 99 and rotate the shaft 46. In the event that the latch 88 has not been tripped, spring 109 is ineffective and the bracket 106 and rock arm 105 remaining stationary, the spring yielding to permit movement of rod 107. The shaft 46 makes one revolution so that the pusher carriage 57 completes one cycle of operation. In the meantime, the raised portion 117 of cam 115 has passed the roller 114 and the latter has been returned to normal position by the spring 116 so that the stop nut 108 engages the bracket 106 and returns the trip arm 91 to normal position with the stop pin 96 in the path of pawl 98. The shaft 46 therefore stops after completing one revolution and remains stationary until the arms 77 and 78 are again operated and until the cam 115 again rotates.

As soon as the carriage 57 returns to the position shown in the drawings, so that the laterally extending arms of the pusher plates 62 are removed from the path of travel of empty packages on the tape 31, the package which was previously held between the stop plates 63 and 64 is moved forward to press against the arms 77 and 78. In the meantime, three or more empty packages are advanced by the tape 31 and as soon as at least four packages press against the arms 77 and 78, the latch 88 is tripped and shaft 46 is ready to rotate as soon as cam 115 comes into operation to release the pawl 98 as above described.

The group of packages which has been transferred to the machine by the above described operation is now advanced to a position to receive a rough filling and weighing. The carrier mechanism for pushing the packages from the transfer table 65 to the scale pans of the weighing devices will now be described. Fixed on the continuously rotating drive shaft 25 is a bevel gear 118 that meshes with a bevel gear 119 on a vertical shaft 120 journalled in suitable bearings in the machine base 26 and table 30. The upper end of the shaft 120 carries a bevel gear 121 (Fig. 4) meshing with a bevel gear 122 fixed on a horizontal shaft 123 supported in bearings on the table 30. At one end of shaft 123 is a spur gear 124 (Figs. 2 and 11) meshing with a spur gear 125 loosely mounted on a horizontal stub shaft 126 that is journalled in bearings on the table 30. The hub of the gear 125 carries a ratchet 127 adapted to be engaged by a spring-pressed pawl 128 carried by a pawl carrier 129 fixed on the shaft 126.

This shaft 126 serves to drive the package carrying devices intermittently when the pawl 128 engages ratchet 127, the gear 125 rotating continuously by virtue of its connections with the continuously rotating drive shaft 25. The engagement of pawl 128 with ratchet 127 is controlled by mechanism operated from a cam forming part of the timing cam assembly, as shown in Fig. 12. Referring to this figure, the tail of the pawl 128 is normally engaged by an arm 130 pivoted at 131 so that the pawl is held out of engagement with the ratchet 127. An arm 132 rigidly connected with the arm 130 is connected by a rod 133 with the lower end of a lever 134 pivoted at 135. The upper end of the lever 134 carries a cam roller 136 that is held in engagement with the surface of a cam 137 by means of a spring 138. Cam 137 rocks the lever 134 at predetermined intervals timed in relation to the operation of the machine and thereby rocks the arm 130 to free the pawl 128 and to permit said pawl to engage ratchet 127. The shaft 126 is then driven by the gear 125 through one complete revolution, at which time the arm 130 again engages the pawl 128 and trips it out of engagement with ratchet 127.

On the end of shaft 126 is mounted a coupling member 139 having a slot 140 (Fig. 11) engaged by a pin 141 pivoted at 142 on a second coupling member 143, so that a horizontal shaft 144 is caused to rotate together with shaft 126. The centers of these shafts are offset, thereby producing an eccentric movement of shaft 144. Shaft 144 drives the package carrier mechanism when the shaft 126 rotates, and shafts 144 and 126 are preferably stopped as soon as the pawl 128 is tripped out of engagement with ratchet 127 by means of a detent 145 carried on the end of said shaft and engaged by a drag roller 146 carried by a pivoted arm 147 and held in engagement with said detent by means of a spring 148. Fixed on the shaft 144 is a bevel gear 149 meshing with a bevel gear 150 on the upper end of a vertical shaft 151 which passes through an opening 152 in the table 30 and is carried in suitable bearings 153 supported by the raceways 28. A sprocket wheel 154 is carried on the lower end of the shaft 151 and drives a chain 156 which passes around an idler sprocket 157 carried by a shaft 158 at the opposite end of the machine. The chain 156 carries a plurality of package pushers 159 pivoted to the links of the chain at 160 and provided with rollers 161 whereby said pushers may be swung about their pivots 160 for a purpose to be described hereinafter.

Preferably provision is made for adjustment of the sprocket 157 in order to adjust the tension of the carrier chain 156. Referring to Figs. 9 and 10, the shaft 158 and its bearings 158a are carried by upper and lower raceways 162 and 162'. Brackets 163 and 163' are secured to the raceways 162 and 162' respectively in any suitable manner, as by screws 164 and 164', and said brackets are also adjustably secured to the raceways 28 by suitable means such as screws 165 and 165' passing through elongated slots 166 and 166' formed in the brackets 163 and 163'. The ends of the brackets 163 and 163' carry adjusting bolts 167 and 167' adapted to engage the legs 29a and brackets 27 respectively. By loosening the bolts 165 and 165' and adjusting the bolts 167 and 167', the shaft 158 and sprocket 157 can be moved to adjust the tension of the carrier chain 156.

Movement of the carrier chain 156 and pushers 159, by virtue of the engagement of pawl 128 with ratchet 129 as above described, causes a group of packages to be transferred from the transfer table 65 to the rough load filling and weighing devices. During the filling and weighing operation, the pushers 159 are disengaged from the packages in order to eliminate friction during weighing by the following means. Referring to Figs. 8 and 12, the rollers 160 and 161 of the package pushers 159 ride in the raceways 28. The lower portions of the raceways 28 are provided with a plurality of spaced openings in which engage grooved blocks 168 secured to a bar 169 (Fig. 12). The grooves in the blocks 168 secured to a bar 169 (Fig. 12). The grooves in the blocks 168 are arranged normally in alignment with the lower raceway 28 so that they are traversed by the rollers 160 and 161, and said blocks are so spaced that when a group of packages is in position for filling and weighing, the rollers 160 have passed out of the grooves in the blocks 168 while the rollers 161 still engage in the grooves of said blocks.

Mechanism is provided whereby bar 169 is moved laterally at predetermined intervals timed in relation to the operation of the machine whereby rollers 161 are moved and pushers 159 are swung about their pivots 160 and are disengaged from the packages. Referring particularly to Fig. 12, the bar 169 is provided with a pair of spaced blocks 170 to which are pivotally connected links 171. A pair of bell crank levers 172, suitably pivoted at 173, are each connected at one end with one of the links 171 and are connected at their other ends for simultaneous rocking movement about their pivots by means of a connecting rod 174. One of the levers 172 is also connected by means of a rod 175 with a rock arm 176 carried by a transverse rockshaft 177 that is mounted in suitable bearings secured to the raceways 28. A rock arm 178 carried by the shaft 177 is connected by a rod 179 with the lower end of a lever 180 pivoted at 181. The upper end of lever 180 carries a cam roller 182 which is held in engagement with the surface of a cam 183 by means of a spring 184. Cam 183 is provided with a depression and when the roller 182 rides into the depression the lever 180 is rocked by the spring 184 thereby rocking the shaft 177 in a clockwise direction as seen in Fig. 12 and swinging the bell crank levers 172 about their pivots in a counterclockwise direction to move the bar 169 inwardly and to rock the pushers 159 free of the packages. The cam 183 constitutes part of a timing cam assembly which as hereinafter described is stopped once each revolution until filling and weighing has been completed, and the cam 183 is timed to stop with the fingers 159 in the disengaged position in which they remain until the timing cam assembly starts again whereupon the lever 180 and shaft 177 are rocked in the reverse direction and the bar 169 moved outwardly so that the grooves in blocks 168 are again in line with the raceways 28 and the pushers 159 again engage the packages.

The group of empty packages having been transferred from the transfer table 65 as above described is now in position to receive a rough load and to be weighed. Since the packages are handled in groups of three, three independent filling and weighing mechanisms are employed, all of which are preferably the same so that a description of one mechanism will be sufficient. The material to be packaged is fed to the empty packages through hoppers 185, the packages being supported in scale pans 186 carried on scale beams 187 by means of knife edges 188 (Fig. 8), said scale beams being in turn mounted by knife edges 189 on brackets 190 on the machine base 26. As the packages are filled and their weight increases, the scale beams 187 are tipped and this movement of the scale beams is caused to control devices for shutting off the feed of materials from the hoppers 185 and for resetting the scale mechanisms.

One of the mechanisms for controlling the feed of materials from a hopper 185 will now be described in detail (Fig. 8). The shaft 123, which is continuously driven from the drive shaft 25, carries a gear 191 which meshes with a gear 192 on a horizontal shaft 193 supported in suitable bearings on the table 30. The continuously rotating shaft 193 serves to drive agitating or feeding devices in the three hoppers 185 and also to close the gates or valves of said hoppers at predetermined intervals timed in relation to the operation of other mechanisms of the machine by means of a plurality of mechanisms one of which will now be described in detail. Referring to Fig. 14, a toothed clutch member 194 is fixed on the shaft 193 and is adapted to be engaged by a second toothed clutch member 195 that is slidable on the shaft 193. When the clutch members are in engagement, the rotation of shaft 193 is transmitted to a sprocket wheel 196 the hub of which is provided with a pair of arms 197 engaging in slots 198 formed in the hub of the clutch member 195. A sprocket chain 199 passes around and is driven by the sprocket wheel 196, said chain passing around an adjustable idler sprocket 200 (Fig. 8) and also around a sprocket 201 on the shaft 202 of a hopper agitator 203.

During the filling operation, the agitator 203 is continuously driven as above described and the hopper gates are open, but when the scale beams are depressed means are provided for shifting the clutch member 195 out of engagement with clutch member 194 and for closing the hopper gates. Referring again to Fig. 14, the hub of the clutch member 195 is surrounded by a split ring 204 engaged by the forked end of a shifting lever 205 that is pivoted at 206 in bearings mounted on the table 30. A connecting rod 207 is attached at one end to the lower end of the shifting lever 205 and at its opposite end (Fig. 13) extends loosely through an apertured member 208a pivoted in the end of a lever 208 which is suitably pivoted at 209. On one side of the lever 208 the rod 207 is provided with a stop nut 210 engaging the member 208a and on the other side of the lever 208 a spring 211 is interposed between said member 208a and a stop nut 212 on the rod 207. The upper end of lever 208 is curved and provided with a roller 213 which engages in the cam groove 214 of a cam 215 (Figs. 1 and 2) loosely mounted on a shaft 216 that is journaled in bearings on the table 30. The shaft 216 is continuously driven by means of a gear 417 meshing with a gear 418 on the horizontal shaft 123, and as will be understood said shaft 216 carries a plurality of cams 215 one for each of the rough load filling and weighing devices.

Means are provided for connecting the cam 215 with the shaft 216 for rotation therewith when its associated scale beam 187 is depressed. To this end the cam 215 carries a pawl carrier 217 (Fig. 17) on which is mounted a spring-pressed pawl 218 adapted to engage a ratchet 219 fixed on the shaft 216. Engagement of the pawl 218 with the ratchet 219 is controlled by a yoke 220 pivoted at 221 and provided with diametrically opposed upper and lower stop pins 222 and 223. As shown in the drawings, the parts are in the filling and weighing position and the pawl 218 is held out of engagement with the ratchet 219 by the upper stop pin 222. As soon as the scale beam is depressed, the yoke 220 is rocked about its pivots 221 by a mechanism to be described hereafter, moving the upper stop pin 222 out of engagement with the pawl 218 and thereby permitting said pawl to engage ratchet 219, and cam 215 to be driven by the continuously rotating shaft 216 through one-half revolution, at which time the pawl 218 is tripped out of engagement with the ratchet 219 by means of the lower stop pin 223. During this half revolution of cam 215, the cam groove 214 acts to rock the lever 208 about its pivot in a counter-clockwise direction, this movement being transmitted through the rod 207 to the shifting lever 205 whereby the clutch member 195 is shifted to the left as seen in Fig. 14 and disengaged from the clutch member 194 so that the hopper agitator 203 stops.

At the same time means are operated to close the hopper gates and shut off the feed to the packages. Referring again to Fig. 14, a laterally extending arm 224 on the shifting lever 205 is connected by a rod 225 with one end of a lever 226 (Figs. 8 and 13) pivoted at 227. Lever 226 has at its other end a pin and slot connection 228 with a vertically movable rack bar 229 which meshes with gears 230 fixed on the hopper gates 231. When the shifting lever 205 is rocked as above described, the rod 225 rocks the lever 226 and lifts the rack bar 229, being aided by a spring 232 connected between the lever 226 and a stationary part of the machine, so that the hopper gates 231 are closed.

To prevent rebounding of the cam 215, a cam detent 233 is secured thereto in any suitable manner as by bolts 234 (Figs. 6 and 7) and said detent is provided with diametrically opposite depressions 235. A detent roller 236 carried on the end of an arm 237 pivoted at 238 is held by a spring 239 in engagement with the detent 233 and the latter is adjusted with respect to the cam 215 so that the roller 236 enters one of the depressions 235 to stop the cam 215 after the pawl 218 has been released from the ratchet 219.

The stopping of the agitator 203 and the closing of the hopper gates 231, which take place on rocking the yoke 220 as above described, are controlled by the scale beam 187 in the following manner. The yoke 220 is provided with a downwardly extending arm 240 (Figs. 12 and 17) which is connected by a rod 241 with an arm 242 secured on a rockshaft 243 suitably mounted in bearings supported on the machine base 26. On the end of the rockshaft 243 is an arm 244 forming a part of the scale trip mechanism as shown particularly in Fig. 12. A spring 245 normally tends to rotate the arm 244 and the shaft 243 in a counterclockwise direction but this movement of the arm and shaft is prevented by engagement of the end of the arm with a roller 246 carried in the upper end of a vertical trip lever 247 suitably pivoted at 248. This engagement of arm 244 with roller 246 tends to swing the vertical trip lever 247 in a counterclockwise direction about its pivot, but this movement is prevented by engagement of the lower end of the vertical trip lever with one end of a horizontal trip lever 249 suitably pivoted on the machine base 26.

The parts as shown and described are in the filling and weighing position and when the scale beam 187 is depressed by the weight of the filled package, this mechanism is tripped. Referring to Figs. 12 and 13, a downwardly extending trip rod 250 is secured to the scale pan 186, this trip arm being provided with a curved finger 251 adapted to engage and depress one end of a trip lever 252 that is pivoted at 253 and is provided with a hook-shaped end 254 engaging underneath the end of the horizontal trip lever 249. As soon as the finger 251 engages the lever 252, the hooked end 254 raises the horizontal trip lever 249 at one end thereby depressing the other end of said horizontal trip lever. The vertical trip lever 247 is now released at its lower end and hence is free to swing about its pivot 248, thereby permitting arm 244 and shaft 243 to rotate and by the connections above described to rock the yoke 220. It will be understood that the same operations take place for each of the three filling and weighing mechanisms.

When the packages have been filled and weighed, they are removed from the scale pans by the pushers 159 and carried on through the machine while the scale trip mechanisms are reset so as to be ready for the filling and weighing of another group of packages. Each of the scale pans is first elevated to normal position in the following manner. Secured to the laterally extending arm 224 of the shifting lever 205 is a connecting rod 255 which is connected at its other end to an arm 256 mounted on a rockshaft 257. The end of the arm 256 engages the scale beam 187 and as the scale is tripped so as to rock the yoke 220 as above described and to rotate the shifting lever 205, the arm 256 is also rocked to swing the scale beam 187 to normal position ready for the removal of the filled and weighed package and for the reception of one of the next group of empty packages.

The resetting of the scale trip takes place as follows. Secured on the rockshaft 243 is an arm 258 adapted to be engaged by one of a plurality of lugs 259 secured to a bar 260 mounted on the ends of pivoted arms 261 and 262. An arm 263 rigid with the arm 262 is connected by a rod 264 with one end of a lever 265 that is loosely mounted on the rockshaft 177. The other end of lever 265 is connected by a rod 266 with the lower end of a lever 267 pivoted at 268 and carrying at its upper end a cam roller 269 adapted to engage a cam 270 constituting a part of the timing cam assembly. After the scale has been tripped, the cam roller 269 is held in engagement with the cam 270 by the action of springs 245. Cam 270 is provided with a raised portion 271 which engages the cam roller 269 and rocks the lever 267 about its pivot in a clockwise direction thereby moving the bar 260 to the right as seen in Fig. 12. The lug 259 engages the arm 258 and rocks the shaft 243 in a clockwise direction raising the end of the arm 244 above the upper end of the vertical trip lever 247. The latter now swings about its pivot 248 in a clockwise direction by the action of a spring 272, the movement of the vertical trip lever being limited by a stop 273 shown in dotted lines in Figs. 1 and 3. The horizontal trip lever 249 is now free to swing about its pivot 250 in a clockwise direction, the trip lever 252 swinging with it until the movement of both levers is limited by engagement of the trip lever 252 with the trip finger 251. As the raised portion 271 of cam 270 passes the roller 269, spring 245 tends to pull the arm 244 downwardly into engagement with the roller 246, thereby swinging the vertical trip lever 247 into engagement with the horizontal trip lever 249 and the trip mechanism is then reset and is ready for the next filling and weighing operation.

At the same time the shifting lever 205 is again shifted back to weighing position in the following manner. When the shaft 243 is rocked as above described to raise the arm 244, the arm 242 on said shaft rocks the yoke 220 to the weighing position shown in the drawings, moving the lower stop lug 223 out of the path of the pawl 218 and thereby permitting shaft 216 and cam 215 to make a half revolution. Cam 215 rocks the lever 208 in a clockwise direction and through the spring 211 the rod 207 is moved to rock the shifting lever 205 to the position shown in Fig. 14. This movement of lever 205 starts the agitator 203 and opens the hopper gates 231, at the same time lifting the arm 256 from engagement with the scale beam 187. By this time the filled and weighed package has been removed from the scale pan 186 and an empty package has been moved on the scale pan for filling and weighing.

Packages which have been filled and weighed and removed from the scales by the pushers 159 are conveyed to the other side of the machine to a plurality of drip stream filling and weighing mechanisms. To this end the packages are pushed by the fingers 159 along a guideway comprising supporting rails 274 (Figs. 1 and 3) mounted on brackets 275 secured to the machine base and side rails 277 also secured to said brackets. During the passage of the packages between the rough load and drip stream filling and weighing mechanisms they are given a shake-down movement by the following mechanism. A horizontal shaft 278 (Fig. 11), mounted in suitable bearings carried by the machine base 26, is driven by a bevel gear 279 meshing with a bevel gear 280 on the continuously rotating drive shaft 25. Adjacent its outer end the shaft 278 carries a sprocket wheel 281 around which passes a chain 282. A stub shaft 283 likewise mounted on bearings carried by the base 26 carries a similar sprocket wheel 284 around which the chain 282 passes so that shafts 278 and 283 rotate continuously together. Each of these shafts carries an eccentric 285 that is connected by a vertically movable link 286 with an arcuate plunger bar 287 positioned below the rails 274. At intervals along the plunger bar 287, agitator plates 288 are provided which extend between the rails 274 and engage the filled packages as they travel along the guideway. Preferably the agitator plates 288 are bevelled at their ends to permit the free passage of the packages thereover.

Packages are delivered from the guideway to the drip stream filling and weighing mechanisms on the side of the machine opposite the rough load filling and weighing mechanisms. A drip stream filling and weighing mechanism is provided for each package of a group, all three of these mechanisms being the same as the rough load filling and weighing mechanisms. It will be understood that the various operations and mechanisms for the drip stream devices, such as the scale mechanisms and tripping devices, the mechanisms for driving the hopper agitators and for opening and closing the hopper gates, the mechanisms for resetting the scale mechanisms and trip devices and the mechanism for freeing the carrier fingers from the packages during weighing are all entirely similar to the same mechanisms on the rough load side of the machine. Hence a repetition of the description already given is unnecessary, the numerals indicating the drip stream mechanisms being the same as those indicating the rough load mechanisms except that they are primed.

After the drip stream filling and weighing operations, the filled and weighed packages are conveyed away from the machine along a guideway comprising supporting rails 289 and side rails 290 similar to the guideway previously described and are delivered to a suitable conveyor 291 and carried out of the machine.

It will be seen that operation of the various mechanisms of the machine, such as the package transfer mechanism, the package carrier mechanism, and the filling and weighing devices are controlled from a series of cams 115, 137, 183 and 270 all forming a timing cam assembly. The timing cam assembly is driven from the continuously rotating shaft 123 under the control of a master cam which controls the driving connection of the timing cams. Unless proper conditions are established at all control points in the machine, the master cam does not operate to establish this driving connection and no operations take place. To these ends the timing cams above referred to are all carried on a single hub or sleeve 292 that is loosely mounted on a horizontal shaft 293 carried on the table 30. On the inner end of the shaft 293 is loosely mounted a gear 294 meshing with a gear 295 (Fig. 11) fixed on a stub shaft 296 carried in bearings supported on the table 30. A gear 297 on said stub shaft meshes with a gear 298 on the end of shaft 123 so that the gear 294 is continuously rotated. Formed integrally with the gear 294 is a ratchet 299 (Figs. 15 and 16), and formed integrally with the sleeve 292 is a pawl carrier 300 carrying a spring-pressed pawl 301.

The engagement of pawl 301 with ratchet 299 is controlled by a master cam and associated mechanism as shown particularly in Figs. 15 and 16. Fixed on the outer end of the continuously rotating shaft 216′ is a master cam 302 having a depression 303 in its surface. A cam roll 304 normally engages the surface of the cam 302 and is adapted to move into the depression 303, said cam roller being mounted on the end of an arm 305 pivoted at 306 in bearings on the table 30. A link 307 connects the arm 305 with one end of a lever 308 fixed to a rockshaft 309 that is likewise mounted in bearings on the table 30. The shaft 309 likewise carries a latch keeper 310 engaged by a latch 311 pivoted on an arm 312 that is journalled in bearings mounted on the table 30. The end of the arm 312 carries a pin 313 adapted to engage the pawl 301 and hold it out of engagement with the ratchet 299, and the arm 312 is normally held in the position shown in the drawings by a spring 314 which also maintains the latch 311 in engagement with the latch keeper 310. To start the timing cam assembly, the cam roller 304 is caused to move into the depression 303 of the cam 302 by means of a spring 315 connected to the lever 308, thereby rocking the shaft 309 in a clockwise direction as seen in Fig. 15. The latch keeper 310, latch 311 and arm 312 are also rocked in a direction to remove the stop 313 from engagement with the pawl 301 so that the rotation of the timing cam assembly is started. As the roller 304 moves out of the depression 303, the parts are returned to the position shown in the drawings.

The timing cam assembly completes one revolution and then is stopped to await starting by the master cam when proper conditions have been established at all control points in the machine. In order to insure that the pawl 301 shall be tripped out of engagement with the ratchet 299 as soon as a single revolution of the timing cam assembly has been completed, a cam 316 is fixed on the sleeve 292 and engages a cam roller 317 carried by one arm of a bell crank lever 318 that is suitably pivoted on the table 30, the opposite end of the bell crank lever extending under the latch 311 and being normally held in the position shown in the drawings by a spring 319. During the revolution of the timing cam assembly, a raised portion 320 on the cam 316 engages the roller 317 and rocks the bell crank lever 318 to lift the latch 311 from its keeper. By this means the spring 314 is effective to return the arm 312 and pawl stop 313 to the position shown in the drawings, regardless of the position of the master cam, so that said pawl 301 is tripped out on completion of every rotation. Thus the timing cam assembly stops after having completed its rotation and cannot operate again until the roller 304 again moves into the depression 303 to release the pawl 301. The latch resets when the parts are in the position shown in the drawings with the roller 304 on the high part of cam 302.

Means are provided whereby the cam roller 304 is prevented from entering the depression 303 in the event that proper conditions are not established at the various control points of the machine. These control points are preferably established at each of the rough load and drip stream filling and weighing mechanisms, so that the cam roller 304 is prevented from moving into depression 303 in the event any one of these mechanisms fails to trip and also in the event that the carriage 57 has not completed delivery of packages to the carrier fingers 159. To these ends a connecting rod 321 is connected to the lower end of the lever 308 and to the lower end of a lever 322 (Fig. 12) fixed on a rockshaft 323 carried on brackets on the table 30. A pair of rock arms 324 secured on the rockshaft 323 are pivotally connected to the ends of a pair of bars 325 and 325', the opposite ends of said bars being supported by rock arms 324' mounted on a cross shaft 323' that is carried in bearings on the table 30. It will be seen that in order for the cam roller 304 to move into the depression 303 the arm 308 and shaft 309 must rock in a clockwise direction and accordingly the bars 325 and 325' must move to the right as seen in Fig. 12.

A plurality of stop lugs 326 and 326' are adjustably secured to the bars 325 and 325' respectively, there being one of these lugs for each of the rough load and drip stream filling and weighing mechanisms. Each of these lugs is adapted to be engaged by one of a plurality of stop fingers 327 and 327' one of which is connected with each of the filling and weighing mechanisms in such a way that they are depressed out of the path of the lugs 326 and 326' when the weighing mechanisms are tripped but remain in the path of said lugs and prevent movement of the bars 325 and 325' in the event that the weighing mechanisms are not tripped. Referring to Fig. 14 illustrating one of these mechanisms, a link 328 is pivoted at 329 to the shifting lever 205 and is pivotally connected at its opposite end with a bell crank lever 330 pivoted at 331 in a bracket on the table 30. The opposite end of the bell crank lever 330 constitutes the stop member 327 and as shown in Fig. 14 is positioned in the path of the lug 326. When the shifting lever 205 is rocked in a counterclockwise direction on its pivot 206 by the tripping of the weighing mechanism as described above, the bell crank lever 330 is rocked on its pivot 331 and the stop lug 327 is depressed below the path of movement of the lug 326. It will be seen that when all of the weighing mechanisms are properly tripped, all of the stop lugs 327 and 327' are removed from the path of the lugs 326 and 326' whereas if any weighing mechanism fails to trip its stop lug 327 and 327' will remain in the path of the associated lug 326 or 326' and prevent movement of the bars 325 and 325'. In this event the cam roller 304 cannot move into the depression 303 and the timing cam assembly will not begin another cycle.

Means are also provided for preventing movement of the bars 325 and 325' until the carriage 57 has completed a cycle of operation. To this end a cam 332 (Fig. 12) is fixed on the carriage drive shaft 46 and is engaged by a roller 333 on the end of a bell crank lever 334 pivoted on the machine base 26. The other end of the bell crank 334 is connected by a rod 335 with one end of a bell crank lever 336 that is carried loosely on the cross shaft 177. A rod 337 is connected at one end to the bell crank 336 and at the other end to a bell crank 338 that is pivotally mounted at 339 on the table 30. The other end of the bell crank 338 constitutes a stop lug 340 which is positioned in the path of a stop lug 341 secured to the bar 325. When the roller 333 engages the low part of the cam 332, the stop lug 340 is in the path of the stop lug 341 and prevents movement of the bar 325. After the shaft 46 completes a revolution and carriage 57 has transferred a group of packages into the machine, the cam 332 stops with the roller 333 on the high part of the cam as shown in Fig. 12 and through the above described connections the bell crank lever 338 is rocked to depress the stop lug 340 out of the path of the stop lug 341 so that the master cam can release the pawl 301 and the timing cam assembly can rotate through another cycle.

Manually operated means are preferably provided whereby the machine may be stopped upon completion of the rotation of the timing cam assembly. Referring to Fig. 12, a cross shaft 342 is mounted in bearings on the table 30 and is normally held in the position shown in the drawings by a coil spring 343. The shaft 342 is provided with handles 344 whereby it may be rotated in a counterclockwise direction, whereupon a rock arm 345 fixed to said shaft acts through a connecting rod 346 to rock a bell crank lever 347 pivoted on the table 30. A stop lug 348 carried by said bell crank lever is thereupon moved into the path of a stop lug 349 adjustably secured to one of the bars 325 so that movement of the bars is prevented and the roller 304 cannot move into depression 303.

In summary, the operation of the machine takes place as follows: Assuming the packages and parts to be in the position shown in the drawings, a group of three packages is being filled and weighed at both the rough load filling and weighing positions and the drip stream filling and weighing positions, the fingers 159 being removed from the packages, and the carriage 57 has completed a cycle of operations so that a group of empty packages is in position on the table 65. The shaft 46 driving the package carrier 57 has stopped in the position shown in Fig. 12 with the cam roller 333 engaging the high part of cam 332 so that the stop lug 340 is depressed out of the path of the stop lug 341. As soon as the carriage was returned to the position shown in Fig. 2, another group of four packages was moved by the conveyor tape 31 into the position shown in Fig. 2 and the fingers 77 and 78 were operated to trip the latch 88. Operation of the carriage however awaits rotation of the cam 115 of the timing cam assembly.

As each of the packages is filled, a scale beam 187 is depressed, the trip mechanism is tripped, and the spring 245 rotates the shaft 243 and rocks the yoke 220 from the weighing position shown in the drawings to non-weighing position. Cam 214 now rotates through a half revolution and rocks the shifting lever 205 thereby stopping the hopper agitator 203, closing the hopper gates 231, and depressing the arm 256 to restore the scale pan 186 to normal position. At the same time the stop lug 327 is depressed out of the path of the stop lug 326.

As soon as all of the packages have been filled and weighed and all of the stop lugs 327 and 327' have been moved out of the path of the lugs 326 and 326', the cam roller 304 moves into the depression 303 in the master cam 302, releasing the pawl 301 and starting the rotation of the timing cam assembly. One complete revolution of the timing cam assembly takes place, during which the cam 316 disengages the latch 310, 311 and permits the stop pin 313 to engage the pawl 301 at the end of this revolution.

The following operations are effected during the rotation of the timing cam assembly. The first cam to operate is cam 183 which moves the bars 169 and 169' outwardly to swing the carrier fingers 159 into engagement with the filled and weighed packages at each of the rough load and drip stream filling and weighing mechanisms. Immediately thereafter cam 137 moves the arm 130 and releases the pawl 128 for engagement with the ratchet 127, whereby the carrier chain 156 and fingers 159 are moved through a predetermined distance. This movement of the carrier chain removes the filled and weighed packages from the rough load and drip stream filling and weighing mechanisms and delivers a new group of packages to each of these mechanisms. As the movement of the carrier fingers 159 is completed, cam 270 moves the bar 260 and through the arms 242 rocks the shafts 243 thereby raising the arms 244 and re-setting the scale mechanisms for another weighing operation. This rocking of the shafts 243 likewise rocks the yokes 220 back to the weighing position shown in the drawings, causing cams 214 to make a second half revolution. Shifting levers 205 are thereby returned to the weighing position shown in the drawings, lifting arms 256 from engagement with the scale beams 187, starting the hopper agitators 203, opening the hopper gates 231, and elevating the stop lugs 327 and 327' in the path of the stop lugs 326 and 326'. During these operations, cam 115 has released the pawl 98 to cause the shaft 46 to rotate through a complete revolution, thereby reciprocating the carriage 57 and at the same time causing the stop lug 340 to be elevated in the path of stop lug 341.

The timing cam assembly now comes to rest as above described and cannot be started again until the cam roller 304 moves into the depression 303 of the master cam. This movement of the cam roller cannot take place until after the shaft 46 has come to rest with the stop lug 340 depressed as above described and until after all of the packages have been filled and weighed again and all of the lugs 327 and 327' have been depressed as above described. The starting of the timing cam assembly may also be prevented by the manually controlled stop lug 348.

From the foregoing, it will be noted that the operations of the machine are controlled by a plurality of cams constituting a timing cam assembly having a single driving means and that the driving means is controlled by mechanism including a master cam in such a way that the timing cam assembly cannot rotate until proper conditions have been established at all of the control points of the machine. The arrangement of the rough load and drip stream filling and weighing mechanisms on opposite sides of the machine saves space and makes possible a parallel arrangement of mechanism for operating all of these devices from a single timing cam assembly. This in turn makes possible the control of the entire machine from a single master cam. A machine as above described is not only relatively compact but is also capable of handling a large number of packages at relatively high speed due to the means whereby the packages are transferred to the machine and filled and weighed in groups comprising a plurality of packages. Thus the work which can be accomplished in the time necessary for one complete cycle of operations is multiplied practically by three in this instance. Moreover, the means provided for removing the carrier fingers from contact with the packages during the weighing operation eliminates friction and provides more accurate results.

It will be understood that the invention is not limited to the form described and illustrated in the drawings and that changes can be made in the form, details and arrangement of the parts without departing from the spirit of the invention. Thus some of the individual elements and trains of mechanism can be rearranged or replaced by equivalents known to the art and the invention is not to be construed as limited to the particular mechanism shown, reference being had to the appended claims for a definition of the limits of the invention.

What is claimed is:

1. In apparatus of the class described, the combination of a plurality of rough load filling and weighing mechanisms, a plurality of drip stream filling and weighing mechanisms, package carriers means for conveying packages to and from said mechanisms, a single intermittently rotatable shaft having mounted thereon a plurality of timing cams for common control of the operation of said filling and weighing mechanisms and package carrier means, and a continuously rotatable master cam for controlling the operation of said shaft.

2. In apparatus of the class described, the combination of a plurality of rough load filling and weighing mechanisms, a plurality of drip stream filling and weighing mechanisms, package carrier means for conveying packages to and from said mechanisms, a single intermittently rotatable shaft having mounted thereon a plurality of timing cams for common control of the operation of said filling and weighing mechanisms and package carrier means, a continuously rotatable master cam and cooperating roller for controlling the operation of said shaft and means operatively connected with all of said weighing mechanisms for controlling the engagement of said roller with said cam and the establishment of a drive for said shaft.

3. In apparatus of the class described, the combination of a plurality of rough load filling and weighing mechanisms, a plurality of drip stream filling and weighing mechanisms, package carrier means for conveying packages to and from said mechanisms, means for delivering packages to said carrier means, a single intermittently rotatable shaft having mounted thereon timing mechanism for common control of the operation of all of said filling and weighing mechanisms, said carrier means and said delivering means, and a continuously rotatable master cam for controlling the operation of said shaft.

4. In a machine of the class described, the combination of a filling and weighing device, a package carrier for conveying a package to said device, a conveyor for delivering a package to said carrier, timing mechanism for said device, carrier and conveyor and having a common drive, a master cam and roller controlling said drive, and means operatively connected with said conveyor and device and with said roller to prevent the latter following the cam surface except after completion of conveyor movement and weighing.

5. In a machine of the type having a filling and weighing device, a package carrier for moving a package to said device, and means for moving the package carrier clear of the package during weighing, the combination of timing means having a common intermittently operative drive and controlling the operation of said device, carrier and moving means in timed relation, and a continuously rotatable master cam for controlling the establishment of said drive.

6. In a machine of the type having a filling and weighing device, a package carrier for moving a package to said device, and means for moving the package carrier clear of the package during weighing, the combination of timing means having a common intermittently operative drive and controlling the operation of said device, carrier and moving means in timed relation, a continuously rotatable master cam for controlling the establishment of said drive, and means operatively connected with said device for rendering said cam ineffective to establish said drive until after filling and weighing is completed.

7. In a machine including a scale, the combination of a movable package carrier having pivotally mounted thereon a plurality of members for pushing packages onto the scale, rollers on said carrier coaxial with said pivots, a trackway having a groove therein for guiding said carrier rollers, means carried by each of said pusher members for also engaging said trackway groove, and means for moving said pusher members out of contact with the packages during weighing by swinging them about their pivots including a displaceable section of said trackway adjacent the weighing position and means for moving said section together with the trackway engaging means of one of said pusher members laterally with respect to the remainder of said trackway.

8. In a machine including a scale, the combination of a movable package carrier having pivotally mounted thereon a plurality of members for pushing packages onto the scale, rollers on said carrier coaxial with said pivots, a trackway having a groove therein for guiding said carrier rollers, follower means carried by each of said pusher members on the side of its pivot opposite to the package engaging portion for also engaging said trackway groove, a section of said trackway adjacent the weighing position displaceable with respect to the remainder of said trackway, and means for displacing said section when occupied by the follower of one of said pusher members, whereby the latter may be moved out of contact with the packages during weighing.

9. In a machine including a scale, the combination of a movable package carrier having pivotally mounted thereon a plurality of members for pushing packages onto the scale, rollers on said carrier coaxial with said pivots, a trackway having a groove therein for guiding said carrier rollers, follower means carried by each of said pusher members on the side of its pivot opposite to the package engaging portion for also engaging said trackway groove, a section of said trackway adjacent the weighing position displaceable with respect to the remainder of said trackway, means for displacing said section when occupied by the follower of one of said pusher members, whereby the latter may be moved out of contact with the packages during weighing, and scale controlled means for effecting replacement of said section upon completion of the weighing.

10. In a machine including a scale, the combination of a movable package carrier having pivotally mounted thereon a plurality of package pusher members, means for moving said carrier for delivery of packages to the scale, rollers on said carrier coaxial with said pivots, a trackway having a groove therein for guiding said carrier rollers, follower means carried by each of said pusher members on the side of its pivot opposite to the package engaging portion for also engaging said trackway groove, a section of said trackway adjacent the weighing position displaceable with respect to the remainder of said trackway, means for displacing said section when occupied by the follower means of one of said pusher members, whereby the latter may be moved out of contact with the packages during weighing, and for replacing said section upon completion of the weighing, and scale controlled mechanism for operating said moving, displacing and replacing means in timed relation.

CHARLES F. RICHARD.